Feb. 2, 3,560,875

BEAM ANGLE LIMITER

Filed Sept. 11, 1967

INVENTOR.
JOHN A. MACKEN
BY
ATTORNEY

Feb. 2, 1971          J. A. MACKEN          3,560,875

BEAM ANGLE LIMITER

Filed Sept. 11, 1967          4 Sheets-Sheet 4

ROTATING PRISM Q-SPOILER

UNIAXIAL BIREFRINGENT PLATES COATED TO ALSO SERVE AS A SUBSTRATE FOR THIN FILM POLARIZER

ANGLE PERPENDICULAR TO ROTATION OF PRISM 62 IN MILLIRADIANS

ANGLE FROM LASING AXIS IN PLANE OF PRISM ROTATION IN MILLIRADIANS

INVENTOR.
JOHN A. MACKEN

BY

*Philip M. Hinderstein*

ATTORNEY

United States Patent Office 3,560,875
Patented Feb. 2, 1971

3,560,875
BEAM ANGLE LIMITER
John A. Macken, Orange, Calif., assignor to North American Rockwell Corporation
Filed Sept. 11, 1967, Ser. No. 66,629
Int. Cl. H01s 3/00; G02b 5/30
U.S. Cl. 331—94.5          5 Claims

ABSTRACT OF THE DISCLOSURE

The light emitted from a laser is first passed through a linear polarizer and then through a quarter-wave plate to produce circularly polarized light. The circularly polarized light is then transmitted through a birefringent crystal, which may be either uniaxial or biaxial, with the optic axis of the crystal positioned substantially parallel to the light beam. The light emergent from the crystal passes through a second quarter-wave plate and through a second polarizer and is then reflected back through the system.

BACKGROUND OF THE INVENTION

(1) Field of the invention

The present invention relates to a beam angle limiter and, more particularly, to a method and means for reducing the divergence of the light beam from a laser.

(2) Description of the prior art

Ever since the invention of the laser, many practical uses have been proposed therefor based upon its inherent property of producing a highly collimated beam of light. For example, this property makes the laser extremely valuable in communication systems, in radar systems, as a weapon and, more recently, in medical research. The operation of all of these systems and devices is affected by the degree of collimation of the laser light beam. In other words, as the divergence of the output beam increases, the effective utility of these devices decreases proportionally. Conversely, any technique or device for increasing the collimation of the laser light beam improves the laser's characteristics and makes the laser a more valuable and useful device wherever it is used.

Several methods have been proposed and are presently available for reducing the divergence of a laser beam. However, all existing methods suffer from at least one of several drawbacks. One presently available method employs a lens to focus the collimated beam emerging from the laser onto a pinhole field stop. The light exiting from the pinhole is recollimated by another lens and then the light is reflected back through the pinhole. In such a method, the beam divergence is controlled by controlling the size of the pinhole. Only those rays of light which are parallel to the axis of the laser cavity are focused on the center of the pinhole. One problem with such a configuration is that the field stop and lenses must be accurately aligned so that the focused beam falls directly at the center of the pinhole. In addition, the use of lenses for focusing and collimating makes the system very lossy. Finally, the off-axis laser light which is being eliminated, hits the edge of the pinhole and has a tendency to burn or otherwise damage the field stop in high power applications.

Another presently available method for reducing beam divergence is the Lummer-Gehrke plate which is placed in the path of the laser beam in the laser cavity. The Lummer-Gehrke plate operates to reflect the incident laser beam several times at angles which are very close to the angle of total internal reflection. In this manner, the divergent portions of the laser beam will strike the surfaces of the plate at angles other than the angle of total internal reflection and will be attenuated. The primary problem with a Lummer-Gehrke plate is that it is extremely difficult to fabricate and align so that the surfaces are exactly at the appropriate angles. In addition, a Lummer-Gehrke plate only prevents beam divergence in one direction. A second Lummer-Gehrke plate would have to be used to limit the beam spread in a direction perpendicular to the first direction.

The pinhole field stop and the Lummer-Gehrke plate are presently the most widely used techniques for reducing the beam divergence in a laser. Other less common beam angle limiting devices do in fact exist. However, they have the same or similar drawbacks as those mentioned above.

SUMMARY OF THE INVENTION

According to the present invention, there is provided a beam angle limiter, especially for use with a laser which is better suited than any of the known devices for restricting the spread of the collimated beam of light therefrom. In its simplest form, the present device is similar to an optical ring gunsight. The present beam angle limiter consists of a birefringent crystal cut in the form of a plane-parallel plate with its input and output faces parallel or perpendicular to the optic axis. Linearly or circularly polarized light travelling through the crystal parallel or perpendicular to the optic axis is unaffected by the birefringence of the crystal and emerges with its original state of polarization. On the other hand, polarized light passing through the crystal at an agle to the optic axis will be affected by the birefringence of the crystal. The greater the angle from the optic axis, the greater the relative retardation between the two perpendicular linearly polarized components which can be thought of as making up linearly or circularly polarized light. As the angle to the optic axis increases, these two perpendicular components periodically undergo an odd multiple of half-wave phase retardations and additions resulting in a series of concentric dark rings or lines. Such a technique is employed to limit the beam divergence of the laser since the laser will be unable to lase at an angle corresponding to one of the dark rings or lines.

OBJECTS

It is therefore an object of the present invention to provide a novel beam angle limiter.

It is a further object of the present invention to provide a method and means for reducing the divergence of the light beam from a laser.

It is a still further object of the present invention to restrict the angle of high transmission of a laser by inserting a birefringent material and a pair of polarizers in the path of the laser beam in the laser cavity.

It is another object of the present invention to provide a method and means for narrowing the beam of a laser by inserting a plurality of birefringent crystals and polarizers in the path of the laser beam.

It is still another object of the present invention to provide a method and means for reducing the divergence of a beam of light.

Still other objects, features and attendant advantages of the present invention will become more apparent to those skilled in the art from a reading of the following detailed description of several embodiments constructed in accordance therewith, taken in conjunction with the accompanying drawings wherein:

DESCRIPTION OF THE PREFERRED EMBODIMENTS

According to the present invention, there is provided a beam angle limiter which consists of a birefringent crystal cut in the form of a plane-parallel plate with the two faces, in the most useful case, perpendicular to the optic axis. Linearly or circularly polarized light travelling parallel to the optic axis is unaffected by the birefringence of the crystal and upon emergence retains its original state of polarization. On the other hand, circularly or linearly polarized light passing through the crystal at an angle to the optic axis will be effected by the birefringence of the crystal. The greater the angle from the optic axis, the greater the relative retardation between the two perpendicular linearly polarized components which can be thought of as making up linearly or circularly polarized light. If circularly polarized light is transmitted through the crystal and is then passed through a quarter-wave plate to convert it to linearly polarized light, and then through a linear polarizer, an observer viewing the emergent light would see a series of concentric dark rings. The angle made by these dark rings with the optic axis corresponds to the angle at which the circularly polarized light undergoes an odd multiple of half-wave phase retardations between the two components of the circularly polarized beam.

The angles that each of the dark rings subtend depend on four things: (1) the length of the birefringent crystal; (2) the degree of birefringence of the crystals; (3) the wavelength of the light used; and (4) the type of birefringent crystal used, i.e. uniaxial or biaxial. The effect of the first three of these variables is relatively easy to understand. The length of the crystal varies the angles of the rings because it directly effects the amount of phase retardation between the two components of the circularly polarized beam. In addition, the degree of birefringence of the crystal and the wavelength of the light used also directly effect the amount of phase retardation. On the other hand, the significance of the difference in the two types of birefringent crystals may not be readily apparent.

Figure 1A:
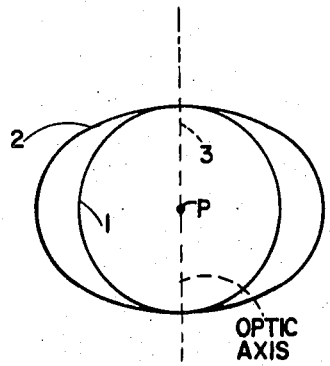
FIGS. 1a and 1b are drawings of the wave surfaces obtained in uniaxial and biaxial crystals, respectively.
Figure 1B:
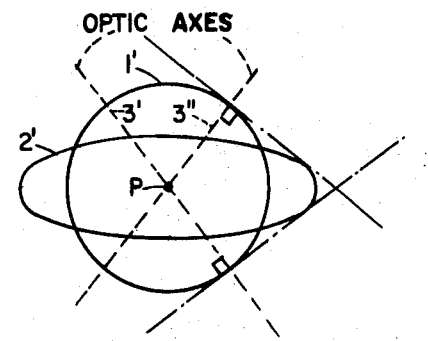

Referring now to the drawings and, more particularly, to FIGS. 1a and 1b thereof, there is shown drawings of the wave surfaces obtained in uniaxial or biaxial crystals, respectively, so as to show the difference between the two types of crystals. The wave surface obtained is a wave front, or pair of wave fronts, completely surrounding a point source P of monochromatic light. Isotropic substances, such as glass, would be represented by a single wave surface and this would take the form of a sphere, shown as 1 in FIG. 1a and 1' in FIG. 1b, showing that the velocity of the wave in all directions is the same. In birefringent materials, each polarization component, however, has a different wave surface which would take the form of a sphere or ellipsoid of revolution, the latter being shown as 2 in FIG. 1a and 2' in FIG. 1b.

The optic axes are also indicated in FIGS. 1a and 1b, an uniaxial crystal having a single optic axis 3 and a biaxial crystal having two optic axes 3' and 3". In either case, a ray travelling down an optic axis does not have any phase retardation between the two polarization components. However, if the ray makes some angle $\alpha$ with the optic axis, it will have a different velocity for the two components of polarization.

Figure 2A:
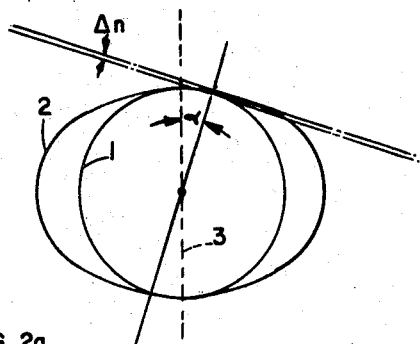
FIGS. 2a and 2b show the effect of small angle changes in uniaxial and biaxial crystals, respectively.
Figure 2B:
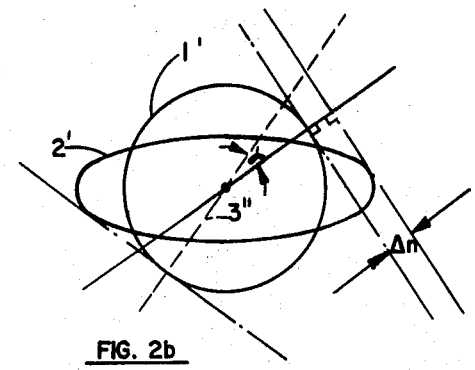

Referring now to FIGS. 2a and 2b which show the effect of small angle changes in uniaxial and biaxial crystals, respectively, it is seen that for an uniaxial crystal, a small change in the angle $\alpha$ introduces only a small change $\Delta n$ in the velocities of the two polarization components. On the other hand, in a biaxial crystal, the same change in $\alpha$ has a much larger effect on the velocities of the ponents. However, if the ray makes some angle $\alpha$ with the two polarization components. Thus, even if uniaxial and biaxial crystals have comparable differences in indices of refraction for the two polarization components, the biaxial crystal can typically have 50 times smaller circles than those for an uniaxial crystal when equal length crystals are put between circular polarizers.

Figure 3A:
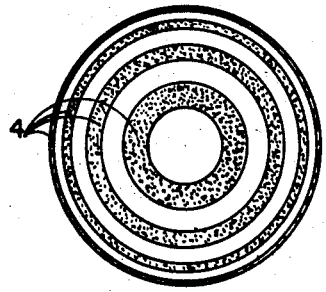
FIGS. 3a and 3b show typical ring patterns for uniaxial and biaxial crystals, respectively.
Figure 3B:

Referring now to FIGS. 3a and 3b, there is seen typical ring patterns obtained when circularly polarized light is passed through uniaxial and biaxial crystals, respectively. The pattern of FIG. 3a consists of a series of concentric rings 4 whereas the pattern of FIG. 3b consists of a series of concentric rings 4'. As can be seen from a comparison of FIGS. 3a and 3b, the uniaxial crystal not only has larger diameter rings but the spacing between rings 4 diminishes with increasing angle. For biaxial crystals, the spacing between rings 4' stays reasonably constant until very large angles are reached. It should be indicated, however, that it is possible to construct a beam angle limiter in accordance with teachings of the present invention using uniaxial crystals since uniaxial crystals exist in which the size of ellipse 2 is very large compared to the size of sphere 1 so that a small angle change introduces a relatively large change in the velocities of the two polarization components.

Figure 4:
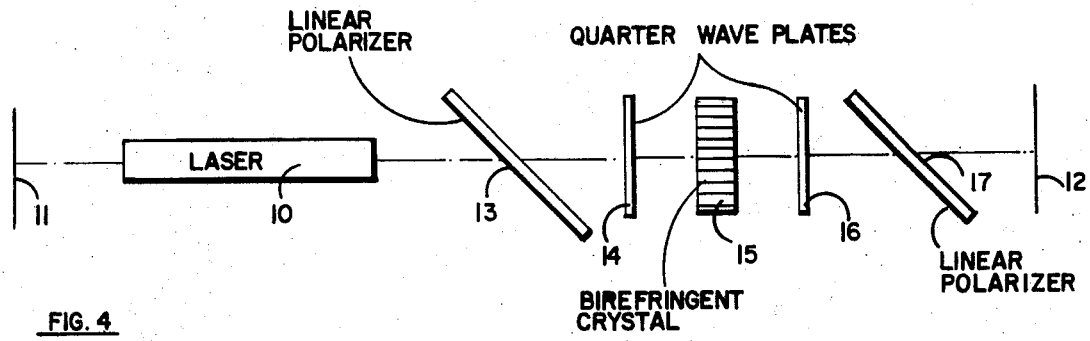
FIG. 4 shows schematically a configuration for a laser beam angle limiter constructed in accordance with the teachings of the present invention.

Referring now to FIG. 4, there is shown schematically the manner of making a beam angle limiter by inserting birefringent crystals, quarter-wave plates and polarizers between the reflectors in a laser cavity. The laser cavity consists typically of a lasing element or laser 10 and a pair of reflectors 11 and 12, one of which is totally reflective and the other of which is partially reflective to provide the output beam. According to the present invention, light emitted from laser 10 will, in travelling toward the right in FIG. 4, first pass through a linear polarizer 13. The types of polarizers best suited for laser work are either a pile-of-plates polarizer or a thin-film polarizer, although any type of polarizer may be used. A thin-film polarizer consists of a glass plate coated with a layer of high index of refraction material of the proper thickness to reinforce reflection of one polarization component when the thin-film polarizer is inserted at Brewster's angle. A polarizer consisting of a thin-film of $TiO_2$ on glass is 92% polarizing with virtually no loss to the transmitted polarization. In addition, it may be pointed out that it may not even be necessary to use a polarizer if a polarizing laser rod such as a ruby or $CaWO_4$ is used.

After emerging from linear polarizer 13, the beam of light passes through a quarter-wave plate or Fresnel rhomb 14 to produce circularly polarized light. In a manner well known in the art, the fast and slow axes of quarter-wave plate 14 are oriented at a 45° angle with respect to the axis of linear polarizer 13. The light then enters a birefringent plate 15 which we will assume is biaxial for present purposes. The optic axis of plate 15 is oriented parallel to the axis of the laser cavity. Off-axis light will be retarded as previously explained, whereas on-axis light will pass through plate 15 unretarded. The light emergent from plate 15 then passes through a second quarter-wave plate or Fresnel rhomb 16 to reconstruct linearly polarized light from the light that is circularly polarized after passing through birefringent crystal 15. The beam is then passed through a second linear polarizer 17 and reflected back through the cavity again by reflector 12. The axis of linear polarizer 17 is oriented with respect to quarter-wave plate 16 so as to match the orientation between linear polarizer 13 and quarter-wave plate 14. Since the light is passed through birefringent crystal 15 twice, the effect thereof is squared.

Figure 5:
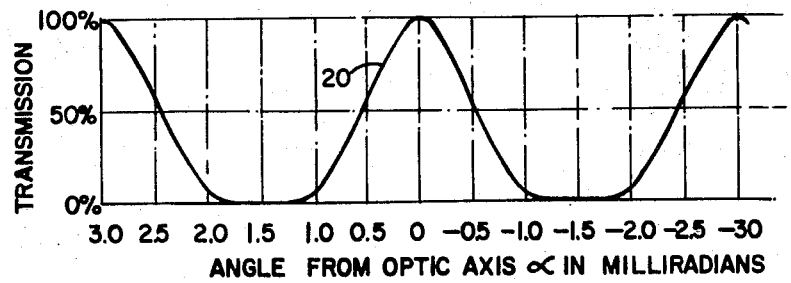
FIG. 5 is a graph of the transmission of light as a function of the angle from the optic axis for the configuration of FIG. 4.

Referring now to FIG. 5, there is shown a graph of the transmission of light through the laser cavity as a function of the angle $\alpha$ from the optic axis for the embodiment of FIG. 4. The graph is for light which has passed through the birefringent plate-polarizer combination twice. The graph shows a curve 20 which indicates that when the angle from the optic axis is zero, there is 100% transmission through the birefringent plate-polarizer combination. However, as the angle $\alpha$ decreases, the transmission gradually decreases and the transmission is down to 50% at a divergence angle of 1 milliradian (.05 to —.05). As the beam divergence increases from 2 to 4 milliradians full angle, there is essentially zero transmission which explains the formation of the ring pattern shown in FIG. 3b.

The graph shown in FIG. 5 is typical of the pattern one would obtain using visible light and a 2 mm. thick piece of Mylar which is a biaxial, birefringent material. Other biaxial materials such as mica and aragonite can also be used. If uniaxial crystals were to be used, they would have to be more than 10 centimeters long to obtain the same effect.

If a laser normally lases with a divergence angle of 5.0 milliradians, then inserting a beam angle limiter into the laser cavity with an angular transmission similar to that shown in FIG. 5 will force the laser to lase with about a 1 milliradian beam spread. This is because at angles greater than .5 milliradian from the optic axis (1 milliradian full angle), the transmission of the crystal has dropped to 50% and it is assumed that a 50% loss is high enough to prevent lasing, especially since the on-axis rays have no loss from the crystal thereby lasing first and keeping the gain of the laser rod down. At 2.5 milliradians off the optic axis (5.0 milliradians full angle) the transmission once again reaches 50%, but if the laser does not normally lase with a beam divergence greater than 5.0 milliradians, as we have assumed, these large angles are also rejected by the laser cavity. Thus, this particular type of beam angle limiter can narrow the beam of the laser down by a factor of 5.

Figure 6:
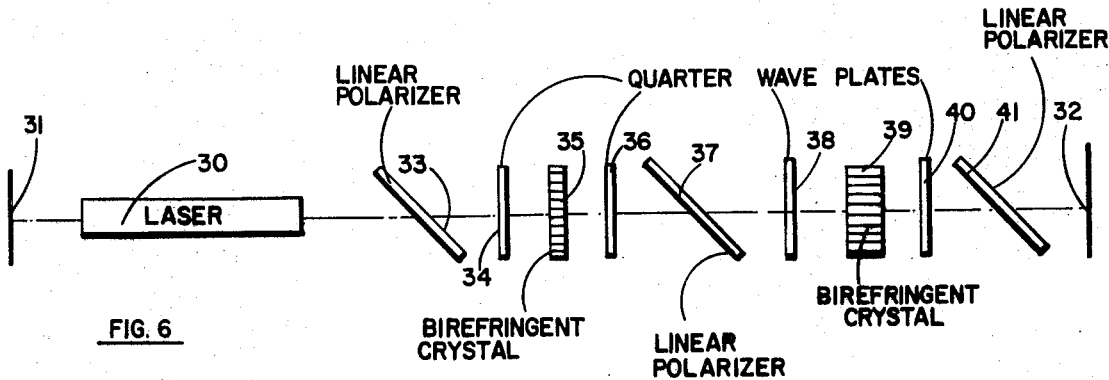
FIG. 6 shows a second configuration of a beam angle limiter constructed in accordance with the present invention for narrowing the beam by an amount greater than that possible with a single birefringent crystal.
Figure 7A:
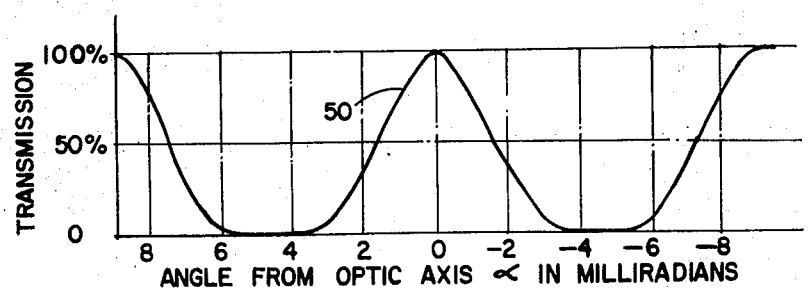
FIGS. 7a–7c are graphs of transmission as a function of angle from the optic axis which are useful in explaining the operation of the embodiment of FIG. 6.
Figure 7B:
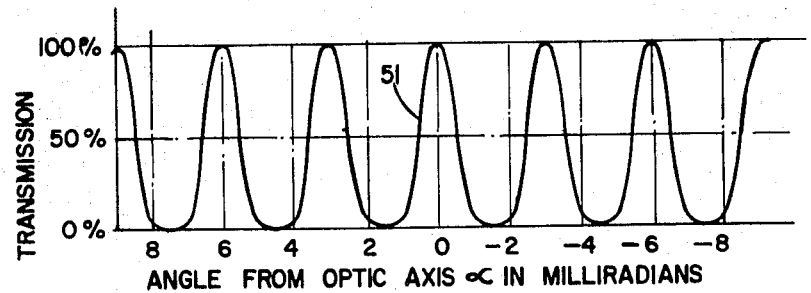
Figure 7C:
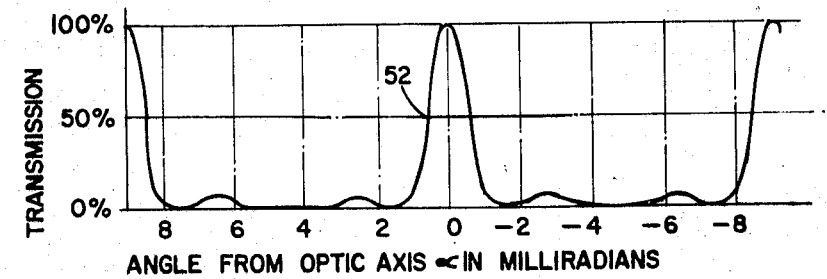

According to the present invention, it is possible to narrow the beam of the laser by a factor greater than 5 by inserting more than one birefringent crystal into the laser cavity. Referring now to FIG. 6, there is shown a second configuration of a beam angle limiter constructed in accordance with the teachings of the present invention in which such further narrowing of the beam may be obtained. As shown in FIG. 6, the laser cavity includes a laser 30 and a pair of reflectors 31 and 32. Inserted within the laser cavity in the path of the beam is a first linear polarizer 33, a first quarter-wave plate 34, a first birefringent plate 35, a second quater-wave plate 36, a second linear polarizer 37, a third quarter-wave plate 38, a second birefringent plate 39, a fourth quarter-wave plate 40, and a third linear polarizer 41. For the present example, it will be assumed that birefringent plate 39 is made of the same material as birefringent plate 35, but is three times thicker. The transmission of birefringent plate 35 as a function of the angle $\alpha$ of the beam from the optic axis is shown as curve 50 in FIG. 7a. The transmission of birefringent plate 39 as a function of the angle $\alpha$ of the beam from the optic axis is shown as curve 51 in FIG. 7b. The combined transmission of plates 35 and 39 is shown as curve 52 in FIG. 7c. As can be seen from FIG. 7c, the divergence of the first transparent ring is 17 times the divergence of the central transmission band (from +8.5 to —8.5). Thus, this type of beam angle limiter could be used to narrow a beam down by a factor of 17 and, of course, it will be obvious that other factors may be obtained by using two or more birefringent plates and by adjusting the relative thicknesses of each of the plates. For example, if the light passes through each crystal only once, the optimum configuration would have the second crystal twice as thick as the first.

The Fresnel reflection losses incurred by inserting one or more birefringent plates into the laser cavity do not need to be too high if the quarter-ware plates and the birefringent materials are put into optical contact with each other. This cuts down the number of surfaces in FIG. 4 from 6 to 2. In addition, thin-film polarizers or pile-of-plates polarizers have low loss for the transmitted polarization. Of course, the quality of the laser rod and the diffraction effects determine how narrow an angle the laser can tolerate without having very high losses.

Figure 8:
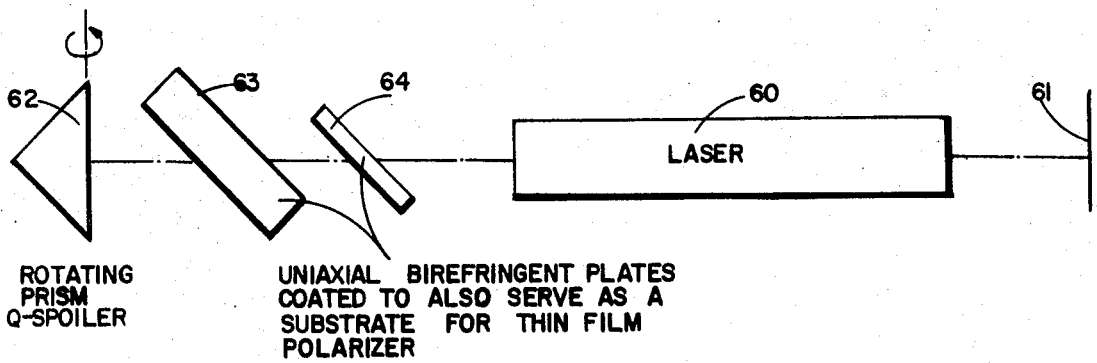
FIG. 8 shows a configuration for a laser for preventing the laser from double spiking and lasing off-axis while Q-spoiling.
Figure 9A:
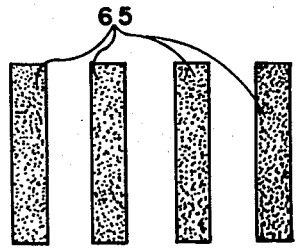
FIGS. 9a and 9b show typical line patterns obtained with the embodiment of FIG. 8.
Figure 9B:
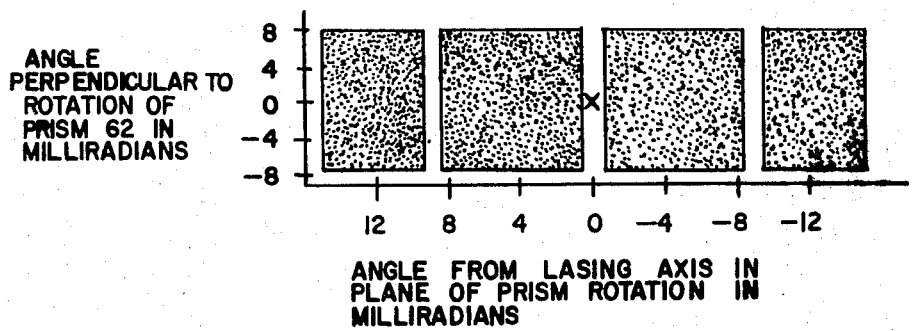

Referring now to FIG. 8, there is shown a configuration for a beam angle limiter which is useful where one wishes to keep a laser from double or triple spiking and lasing off-axis while Q-spoiling with a device such as a rotating prism. In FIG. 8, the laser cavity consists of a laser 60, a partially reflecting mirror 61 for providing the output beam and a rotating prism 62 used as a Q-spoiler for a pulse laser. Inserted in the laser cavity are a pair of plates 63 and 64 of uniaxial, birefringent material with their faces cut parallel or perpendicular to the optic axis. Two plates are used so as to provide a beam narrowing factor of 17 as explained with reference to the embodiment of FIG. 6. Plates 63 and 64 are inserted into the laser cavity at Brewster's angle. With such a configuration, rather than the ring pattern previously described, the plates form a series of straight lines 65 as shown in FIG. 9a which can now give a one-dimensional restriction of the lasing angle. In addition, as long as only a one-dimensional restriction of the lasing angle is required, the plates may use linearly polarized light rather than circularly polarized light as previously required. If the plates are coated to form a thin-film linear polarizer, they act as their own polarizer and nothing more is required. The transmission of one of plates 63 or 64 as a function of the angle of incidence of the beam from the optic axis is similar to that shown in FIGS. 7a and 7b. As seen in FIG. 8, the thickness of plate 63 may be adjusted to be three times that of plate 64 as was the case in the embodiment of FIG. 6. In this manner, the combination of plates 63 and 64 in the laser cavity is similar to the transmission shown in FIG. 7c and is shown in FIG. 9b for the uniaxial case. In FIG. 9b the X denotes the lasing axis. It can be seen that inserting plates 63 and 64 into a rotating prism Q-spoiled laser will substantially prevent off-axis lasing in the plane of rotation of the prism. It will also be appreciated that a two-dimensional restriction of the lasing angle can be obtained with linearly polarized light by inserting a second set of the just described polarizer-birefringent plate combinations in the laser cavity at a 90° angle to the first set.

Whereas the operation of the present beam angle limiter has been described wth the optic axis of the birefringent crystals parallel to the axis of the laser cavity, it will be apparent to those skilled in the art that such need not be the case. If linearly or circularly polarized light is transmitted through a birefringent crystal perpendicular to an optic axis, and then through a polarizer, a series of dark lines will result similar to those shown in FIG. 9a, providing a one-dimensional restriction of the beam angle. Restriction in a perpendicular direction may then be obtained with a second birefringent-polarizer combination.

It can now be appreciated that in accordance with the teachings of the present invention there is provided a laser mode selector for reducing the divergence of the light beam from a laser which substantially eliminates the objections existing with prior art devices. The problem of alignment existing with the pinhole field stop method is substantially eliminated since the effect of the birefringent plate is identical regardless of the point of incidence of the beam on the face thereof. In addition, whereas the Lummer-Gehrke plate provides only a one-dimensional restriction of the beam divergence angle, if circularly polarized light is used in the present invention, there is provided two-dimensional discrimination.

While the invention has been described with respect to several physical embodiments constructed in accordance therewith, it will be apparent to those skilled in the art that various modifications and improvements may be made without departing from the scope and spirit of the invention. For example, whereas the invention has been described in its application of restricting the angle of lasing, it will be apparent that the teachings of the present invention could be applied to many applications where a field stop is required. More particularly, inserting several polarizer-birefringent plate-polarizer combinations in the path of a light beam with a given divergence angle would be effective to reduce the divergence angle thereof without the need for lenses and pinholes as would be the case with conventional field stops. Accordingly, it is to be understood that the invention is not to be limited by the specific illustrative embodiments but only by the scope of the appended claims.

I claim:
1. Apparatus for reducing the divergence of a beam of light, comprising in combination:
   a first linear polarizer interposed in the path of said light beam;
   a birefringent crystal interposed in the path of the light beam emergent from said first linear polarizer, wherein said birefringent crystal is in the form of a plane-parallel plate with the input and output faces thereof perpendicular to the optic axis of the crystal;
   a second linear polarizer interposed in the path of the light beam emergent from said crystal;
   means interposed between said first linear polarizer and said birefringent crystal in the path of said light beam for converting linearly polarized light to circularly polarized light; and
   means interposed between said birefringent crystal and said second linear polarizer in the path of said light beam for converting circularly polarized light to linearly polarized light.
2. Apparatus for reducing the divergence of a beam of light, comprising in combination:
   a first linear polarizer interposed in the path of said light beam;
   a birefringent crystal interposed in the path of the light beam emergent from said first linear polarizer;
   a second linear polarizer interposed in the path of the light beam emergent from said crystal;
   means interposed between said first linear polarizer and said birefringent crystal in the path of said light beam for converting linearly polarized light to circularly polarized light;
   means interposed between said birefringent crystal and said second linear polarizer in the path of said light beam for converting circularly polarized light to linearly polarized light;
   a second birefringent crystal interposed in the path of the light beam emergent from said second linear polarizer; and
   a third linear polarizer interposed in the path of the light beam emergent from said second crystal.
3. The apparatus of claim 2 further comprising:
   means interposed in the path of the light beam emergent from said third linear polarizer for reversing the direction of said beam of light so that said beam again passes through said polarizer and said crystals.
4. The apparatus of claim 3 wherein each of said crystals is made of the same material and wherein one of said crystals is three times as thick as the other of said crystals.
5. Apparatus for reducing the divergence of a beam of light, comprising in combination:
   a first linear polarizer interposed in the path of said light beam;
   a birefringent crystal interposed in the path of the light beam emergent from said first linear polarizer;
   a second linear polarizer interposed in the path of the light beam emergent from said crystal;
   means interposed between said first linear polarizer and said birefringent crystal in the path of said light beam for converting linearly polarized light to circularly polarized light;
   means interposed between said birefringent crystal and said second linear polarizer in the path of said light beam for converting circularly polarized light to linearly polarized light; and
   means interposed in the path of the light beam emergent from said second linear polarizer for reversing the direction of said beam of light so that said beam again passes through said polarizers and said crystal.

References Cited

UNITED STATES PATENTS

| 2,420,252 | 5/1947 | Land | 350—158X |
| 3,060,808 | 10/1962 | Koester | 350—157 |
| 3,324,295 | 6/1967 | Harris | 350—157 |

FOREIGN PATENTS

| 483,493 | 5/1952 | Canada | 350—158 |

OTHER REFERENCES

Jenkins and White, Fundamentals of Optics, sect. 27.9, p. 567.

Polarized Light by William A. Shurcliff, Harvard Univ. Press, pp. 146–7.

RONALD L. WIBERT, Primary Examiner

P. K. GODWIN, Assistant Examiner

U.S. Cl. X.R.

350—147, 157